(12) United States Patent
Maman et al.

(10) Patent No.: US 10,242,595 B2
(45) Date of Patent: Mar. 26, 2019

(54) VISUALLY IMPAIRED ACCESSIBLE SIGNAGE

(71) Applicants: Reuven Maman, Nahariya (IL); Israel Maman, Nahariya (IL)

(72) Inventors: Reuven Maman, Nahariya (IL); Israel Maman, Nahariya (IL)

( * ) Notice: Subject to any disclaimer, the term of this patent is extended or adjusted under 35 U.S.C. 154(b) by 0 days.

(21) Appl. No.: 15/692,330

(22) Filed: Aug. 31, 2017

(65) Prior Publication Data

US 2018/0061277 A1   Mar. 1, 2018

Related U.S. Application Data

(60) Provisional application No. 62/382,357, filed on Sep. 1, 2016.

(51) Int. Cl.
*G09B 21/00* (2006.01)
*A61H 3/06* (2006.01)
*A61H 3/00* (2006.01)

(52) U.S. Cl.
CPC .......... *G09B 21/007* (2013.01); *A61H 3/061* (2013.01); *A61H 2003/002* (2013.01); *A61H 2003/063* (2013.01); *A61H 2003/065* (2013.01); *A61H 2201/0126* (2013.01); *A61H 2201/5015* (2013.01); *A61H 2201/5043* (2013.01); *A61H 2201/5048* (2013.01)

(58) Field of Classification Search
None
See application file for complete search history.

(56) References Cited

U.S. PATENT DOCUMENTS

| | | | | |
|---|---|---|---|---|
| 9,126,122 | B2 * | 9/2015 | Boeckle | A63H 3/28 |
| 9,219,990 | B2 * | 12/2015 | Moldavsky | H04W 4/025 |
| 2015/0356882 | A1 * | 12/2015 | Kim, I | G09B 17/006 434/169 |
| 2018/0089898 | A1 * | 3/2018 | Huddy | G06T 19/006 |

\* cited by examiner

*Primary Examiner* — K. Wong
(74) *Attorney, Agent, or Firm* — William Dippert; Laurence Greenberg; Werner Stemer

(57) ABSTRACT

A system for operating a visually impaired accessible signage, the system comprising: an accessibility tag configured to attach to a signage or to a surface near the signage, store communication information, communicate with a mobile device and prompt display of information by the mobile device, wherein the information is gained from an information file, and a database configured to store at least one information file. Additional embodiments of the system and methods for use thereof are described herein.

18 Claims, 6 Drawing Sheets

VISUALLY IMPAIRED ACCESSIBLE SIGNAGE

CROSS-REFERENCE TO RELATED APPLICATION

This application is based upon and claims priority from U.S. Provisional Patent Application Ser. No. 62/382,357, filed Sep. 1, 2016, the entire contents of which is incorporated herein by reference in its entirety.

FIELD

The present subject matter relates to signage. More particularly, the present subject matter relates to signage accessible to visually impaired people.

BACKGROUND

According to data published by the World Health Organization (WHO), approximately 285 million people worldwide are visually impaired. Of these, 39 million people are blind and 246 million have low vision. One of the challenges faced by visually impaired people is the accessibility of signage—outdoors and indoors. The currently available solutions for this challenge include display of information in braille, and usage of audial information. Braille signs are limited in the amount of information that is available, while audial information may be considered disturbing, particularly indoors. For example, a loud audial message provided by a device attached to a sign in a public service facility may disturb visitors and workers nearby. Therefore, there is a need for a visually impaired accessible signage that is not limited in the amount of information available to a user in one hand, and not disturbing the public on the other hand.

SUMMARY

Unless otherwise defined, all technical and scientific terms used herein have the same meaning as commonly understood by one of ordinary skill in the art to which this subject matter belongs. Although methods and materials similar or equivalent to those described herein can be used in the practice or testing of the present subject matter, suitable methods and materials are described below. In case of conflict, the patent specification, including definitions, will control. In addition, the materials, methods, and examples are illustrative only and not intended to be limiting.

According to one aspect of the present subject matter, there is provided a system for operating a visually impaired accessible signage, the system comprising:
  an accessibility tag configured to attach to a signage or to a surface near the signage, store communication information, communicate with a mobile device and prompt display of information by the mobile device, wherein the information is gained from an information file, and
  a database configured to store at least one information file.

According to another aspect of the present subject matter, there is provided a method for viewing information by a system for operating a visually impaired accessible signage, wherein the system comprises:
  an accessibility tag configured to attach to a signage or to a surface near the signage, store communication information, communicate with a mobile device and prompt display of information by the mobile device, wherein the information is gained from an information file, and
  a database configured to store at least one information file, the method comprising:
    bringing the mobile device close to the accessibility tag, and
    viewing information displayed by the mobile device.

According to yet another aspect of the present subject matter, there is provided a method for accessing information by a system for operating a visually impaired accessible signage, wherein the system comprises:
  an accessibility tag configured to attach to a signage or to a surface near the signage, store communication information, communicate with a mobile device and prompt display of information by the mobile device, wherein the information is gained from an information file, and
  a database configured to store at least one information file, the method comprising:
    bringing a mobile device close to an accessibility tag;
    establishing a communication between the accessibility tag and the mobile device;
    accessing an information file linked to the accessibility tag by using the communication information, and
    running the information file by the mobile device.

According to one embodiment, the accessibility tag is configured to communicate with the mobile device by near field communication (NFC).

According to another embodiment, the communication information is a uniform resource locator (URL) of a website of the database.

According to yet another embodiment, the communication information is permanently burnt on the accessibility tag.

According to still another embodiment, the communication information is changeable.

According to a further embodiment, the information file is configured to provide information relating to the signage to which the accessibility tag is attached.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the drawings.

DESCRIPTION OF THE PREFERRED EMBODIMENTS

Figure 1A:
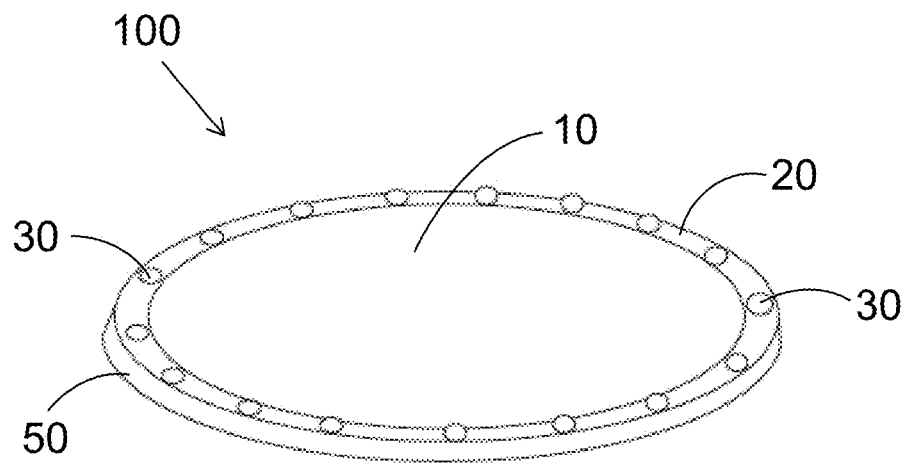
FIGS. 1A and 1B schematically illustrate according to some exemplary embodiments, a perspective view of a tag.

Before explaining at least one embodiment in detail, it is to be understood that the subject matter is not limited in its application to the details of construction and the arrangement of the components set forth in the following description or illustrated in the drawings. The subject matter is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

One aim of the present subject matter is to provide a visually impaired accessible signage system that is not limited in the amount of information available to a user.

Another aim of the present subject matter is to provide a visually impaired accessible signage system that is not disturbing the public in its vicinity.

Yet another aim of the present subject matter is to provide a method for operating a visually impaired accessible signage system.

Still another aim of the present subject matter is to provide a method for using a visually impaired accessible signage system.

It is appreciated that certain features of the subject matter, which are, for clarity, described in the context of separate embodiments, may also be provided in combination in a single embodiment. Conversely, various features of the subject matter, which are, for brevity, described in the context of a single embodiment, may also be provided separately or in any suitable sub combination.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Definitions

The term "visually impaired", or "visually impaired people", or "visually impaired person" as disclosed herein, refers to individuals who are blind or having low vision of any kind known in the art.

The present subject matter provides a visually impaired accessible signage. For the sake of simplicity only, the visually impaired accessible signage of the present subject matter will be termed hereinafter "accessible signage".

The term "NFC" as disclosed herein, refers to Near Field Communication—a set of communication protocols that enable two electronic devices, one of which is usually a mobile device, for example a smartphone, to establish communication by bringing them close to each other, for example in the range of substantially 2-5 cm.

General View

According to one embodiment, the accessible signage is configured for outdoor usage, for example in streets, providing information about nearby facilities, or wayfinding instructions to facilities. According to a preferred embodiment, the accessible signage is configured for indoor usage, for example in public institutions, for example hospitals, universities, governmental facilities and the like, providing for example information about the identity of a nearby room or department, or wayfinding instructions to a certain room or department.

The accessible signage of the present subject matter is simply applicable and easy to implement. Furthermore, the accessible signage of the present subject matter contributes to the independence of the visually impaired people.

According to some embodiments, for the welfare of the visually impaired people, a facility having accessible signage of the present subject matter is marked with a sign post announcing that the facility is equipped with an accessible signage.

System for Operating a Visually Impaired Accessible Signage

The present subject matter provides a system for operating a visually impaired accessible signage. The various components of the system and methods for operating and using the system, are outlined hereinafter.

Accessibility Tag

According to some embodiments, the system comprises an accessibility tag, occasionally designated hereinafter as "tag" for the purpose of simplicity only. The tag is configured to store communication information, as will be detailed hereinafter.

Figure 1B:
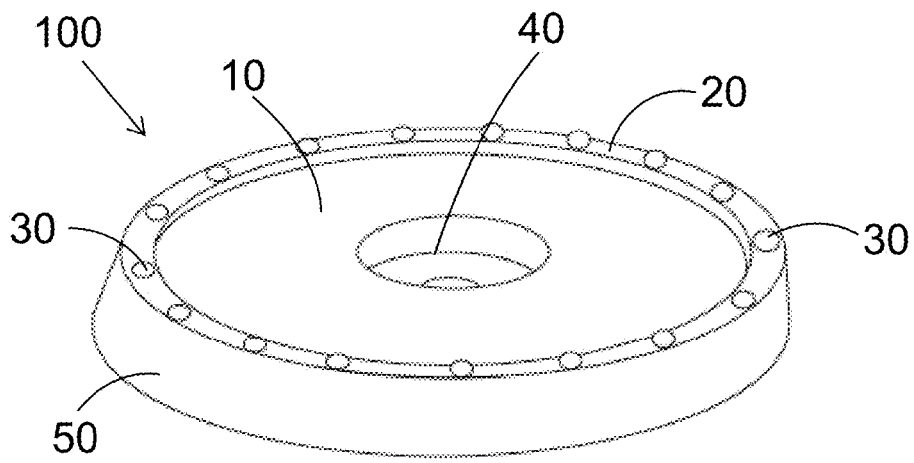

FIGS. 1A and 1B schematically illustrate according to some exemplary embodiments, a perspective view of a tag 100. The tag 100 comprises a first surface 10, a second surface (not shown), a first edge 20 surrounding the first surface 10, a second edge (not shown) surrounding the second surface (not shown), and a wall 50 between the first edge 20 and the second edge (not shown). The first surface 10 is configured to be exposed, and the second surface (not shown) is configured to be attached to a sign or to a wall, preferably adjacent to a sign. According to the embodiment illustrated in FIG. 1A, the height of the wall 50 is low, for example substantially 1 mm. According to the embodiment illustrated in FIG. 1B, the height of the wall 50 is higher, for example in the range of substantially 5-10 mm.

The tag 100 may have any shape and size. For example, the tags 100 illustrated in FIGS. 1A-1B are circular.

The tag 100 is configured to communicate with a mobile device, for example a smartphone, and prompt display of information by the mobile device. According to one embodiment, the tag 100 is configured to communicate with the mobile device in any technology known in the art, for example NFC. Currently, NFC is embedded in leading smartphones, thus facilitating the usage of the accessible signage of the present subject matter by a visually impaired person without the need to download a dedicated application for using the accessible signage.

According to a preferred embodiment, the tag 100 is made of elastic materials. According to another preferred embodiment, the tag 100 is made of insulating materials, rendering the tag 100 compatible to be attached to a metallic surface, so that the metallic surface does not interfere with transmission of information from the tag 100. According yet another preferred embodiment, the tag 100 is configured to be attached to any surface, for example glass, wood, Plexiglass, aluminum, a sheer wall, and the like. According to still another preferred embodiment, the tag 100 is configured to be attached to a surface with a strong adhesive, for example a strong 3M adhesive.

According to one embodiment, the tag 100 is made of materials configured to conserve information embedded in the tag 100 under moist conditions, for example following wiping the tag 100 with a damp cloth.

According to one embodiment, the tag 100 is configured to be attached to an existing sign. According to this embodiment, a tag 100 is provided to entities of interest, for example municipal authorities for outdoor accessible signage, and public institutions for indoor accessible signage, to be attached to existing signs—thus rendering existing signs accessible to visually impaired people. According to another embodiment, the tag 100 is attached to a sign during the manufacture of the sign—thus providing accessible signage.

According to some embodiments, the tag 100 is configured to be easily recognized by visually impaired people. According to one embodiment, illustrated in FIG. 1B the tag 100 further comprises braille marks 30 for easy recognition of the tag 100 by blind people and people having extremely low vision. The braille marks 30 may be located anywhere on the first surface 10 of the tag 100, and in any number and configuration. For example, the tag illustrated in FIG. 1B comprises multiple braille marks 30 arranged on the first edge 20 of the first surface 10 of the tag 100. According to yet another embodiment, illustrated in FIG. 1B, the tag further comprises a "tactile bump" 40 in order to facilitate the recognition and location of the tag by blind people and people having extremely low vision.

Figure 2A:
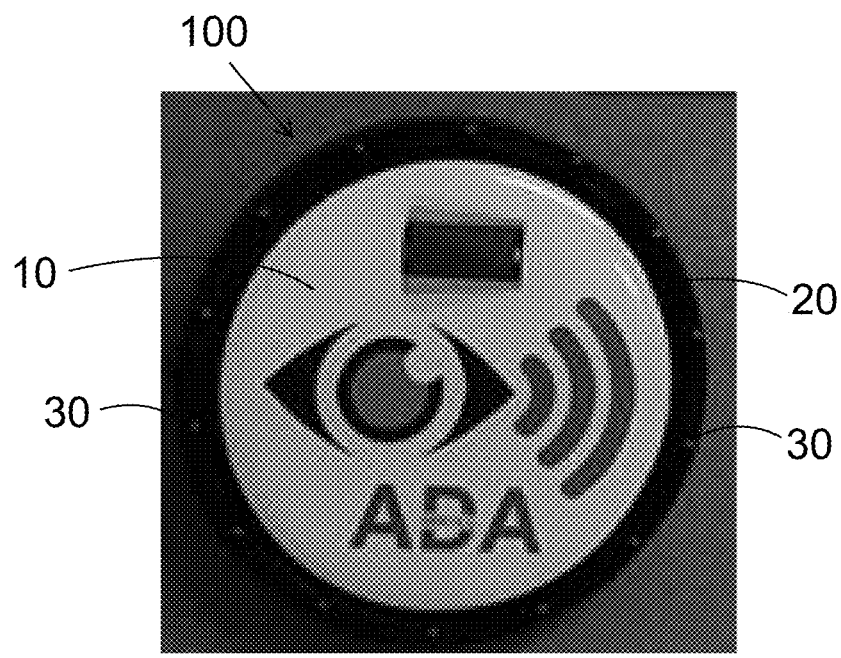
FIGS. 2A and 2B show, according to exemplary embodiments, an upper view and a perspective view, respectively, of a tag, further comprising icons and scripts on a first surface.
Figure 2B:
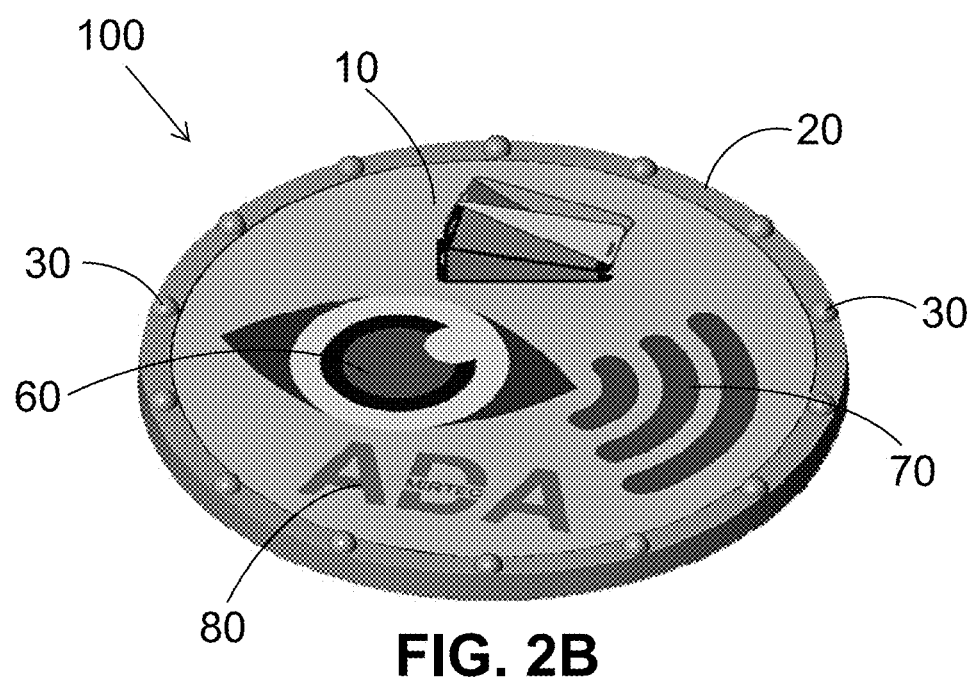

FIGS. 2A and 2B show, according to exemplary embodiments, an upper view and a perspective view, respectively, of a tag 100, further comprising icons and scripts on a first surface 10. The braille marks 30 arranged on the first edge 20, are also shown in FIGS. 2A-2B.

According to one embodiment, at least one icon is drawn on the first surface 10 of the tag 100 for easy recognition and location of the tag 100, particularly by people having low vision. According to the embodiments shown in FIGS. 2A and 2B, an eye icon 60 and a sound icon 70 are drawn on the first surface 10 of the tag 100. These icons hint the purpose of the tag 100—providing visual and audial information to visually impaired people. These icons are clearly identifiable by visually impaired people, thus facilitating the location of the tag by visually impaired people. According to another embodiment, at least one script 80 (letter, or digit, or symbol) is written on the first surface 10 of the tag 100. For example, the term "ADA" is written on the first surface 10 of the tags 100 shown in FIGS. 2A and 2B. Furthermore, the colors used to draw the at least one icon 60 70, and to write the at least one script 80, as well as the color of the background on the first surface 10 of the tag 100, are in compliance with color contrasting specifications of accessibility laws and regulations.

According to a preferred embodiment, the "tactile bump" 40 illustrated in FIG. 1B is located at the center of the eye icon 60 shown in FIG. 2B.

According to some embodiments, the tag 100 may be located anywhere on or near a sign. However, accessibility laws and regulations recommend location of the tag 100 on or near the bottom left side of a sign in order to facilitate location of the tag 100 by visually impaired people. Thus, in order to facilitate location of the tag by visually impaired people, according to preferred embodiments the location of the tag 100 on or near a signs is in compliance with this recommendation.

Figure 3A:
FIG. 3A shows, according to an exemplary preferred embodiment, a tag attached to a bottom left side of a sign.
Figure 3B:
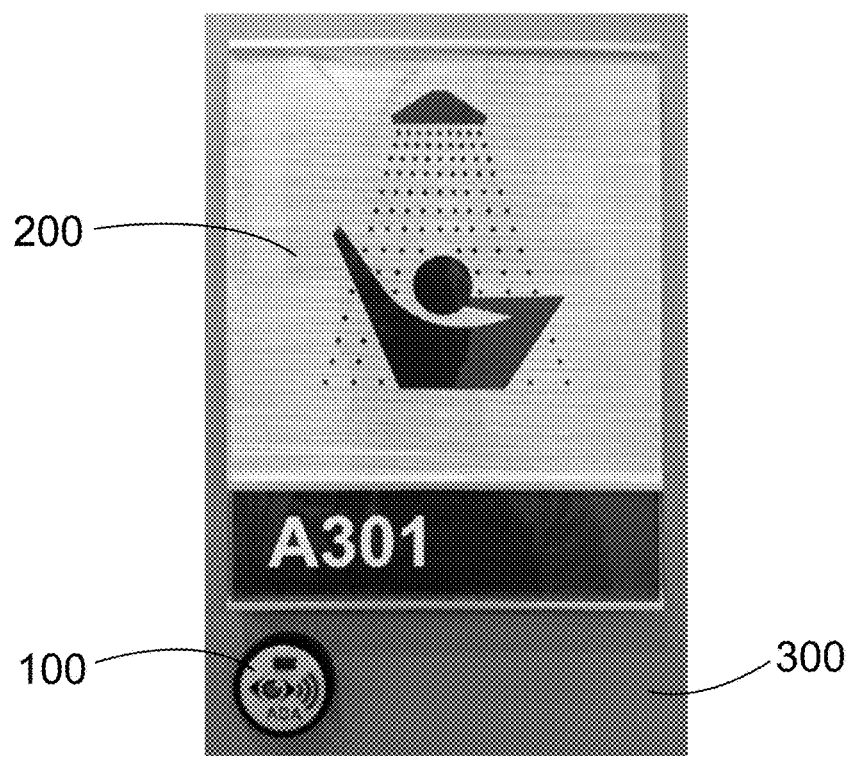
FIG. 3B shows, according to another exemplary preferred embodiment, a tag attached to a wall in the vicinity of the bottom left corner of a sign.

FIG. 3A shows, according to an exemplary preferred embodiment, a tag 100 attached to a bottom left side of a sign 200, and FIG. 3B shows, according to another exemplary preferred embodiment, a tag 100 attached to a wall 300 in the vicinity of the bottom left corner of a sign 200.

A user may attach the tag 100 either on a surface of a sign 200, as shown in FIG. 3A, or outside a sign 200, as shown in FIG. 3B. Nevertheless, according to a preferred embodiment, if a new sign 200 is purchased with a tag 100, the tag 100 is preferably attached to the surface of the sign 200. According to another preferred embodiment, if the tag 100 is to be attached to an existing sign 200 in the institute or facility, the tag 100 is preferably attached outside the existing sign 200.

Elevation Unit

According to some preferred embodiments, when a tag 100 is attached, for example to a wall 300, outside a sign 200, the first surface 10 of the tag 100 is in the same distance from the wall 300 as an exposed surface of the sign 200 near it, in order to facilitate communication between the tag 100 and a mobile device. Thus, according to a preferred embodiment, the height 50 of the tag 100 (see FIG. 1B) is similar to the distance between the wall 300 and the exposed surface of the sign 200. According to another preferred embodiment, when the height 50 of the tag 100 is lower than the distance between the wall 300 and the exposed surface of the sign 200, the system further comprises an elevation unit 400, configured to be attached to the second surface of a tag 100 and increase the height 50 of the tag 100 so the first surface 10 of the tag 100 is leveled with the exposed surface of a sign 200 near the tag 100.

Figure 4:
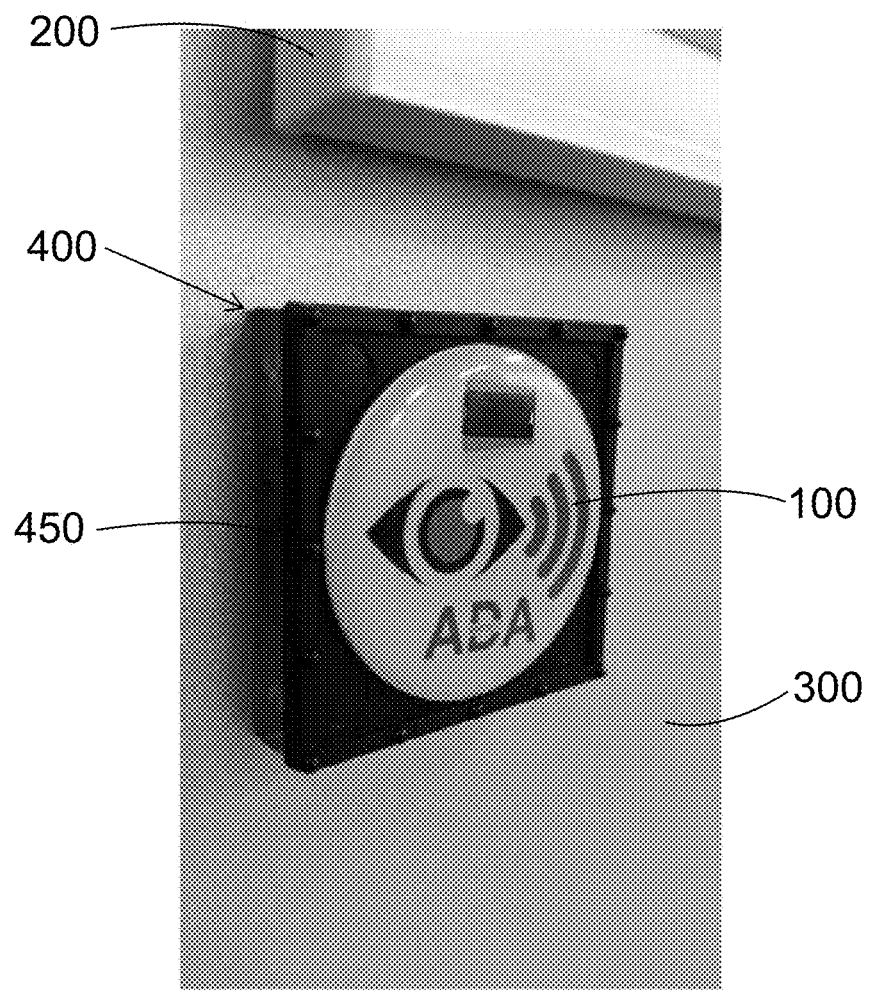
FIG. 4 shows, according to an exemplary embodiment, a tag attached with an elevation unit to a wall near a bottom left corner of a sign.

FIG. 4 shows, according to an exemplary embodiment, a tag 100 attached with an elevation unit 400 to a wall 300 near a bottom left corner of a sign 200. According to one embodiment, the elevation unit 400 comprises a first surface (not shown) configured to attach to a second surface (not shown) of a tag 100, for example by using an adhesive or a double sided adhesive tape; a second surface (not shown) configured to be attached to a surface to which a sign 200 is attached, for example a wall 300, for example by using an adhesive or a double sided adhesive tape; and a height 450 between the first surface and second surface of the elevation unit 400, conjured to bring the first surface 10 of the tag 100 to the same level of the exposed surface of a sign 200.

According to another embodiment, for aesthetic reasons, the shape and dimensions of the elevation unit 400 are similar to the shape and dimensions of the tag 100. For example, if the tag 100 is circular and has a diameter of substantially 3 cm, also the elevation unit 400 is circular and has a diameter of substantially 3 cm, or as shown in FIG. 4, the tag 100 and the elevation unit 400 both have a square shape.

Communication Information

According to some embodiments, the tag 100 stores communication information that is necessary for establishing access of a mobile device to an information file to be displayed by the mobile device. The information file will be described hereinafter. An example of a communication information that is stored in the tag 100 is a Uniform Resource Locator (URL) of a website storing an information file. According to one embodiment, the communication information is permanently burnt on the tag 100 in an immutable manner. This embodiment applies for example to premade tags 100 provided by a supplier. According to another embodiment, the communication information is erasable. According to yet another embodiment, the communication information is changeable. These embodiments apply to customized tags 100 self-made by a customer, for example a public institution. Thus, a customer may replace the communication information with another one as desired, for example, when there is a need to change the name of an employee working in a room marked with the accessible signage of the present subject matter. According to embodiments where the tag 100 is an NFC tag, a customer may change the communication information stored in the tag 100 with an NFC writing application that is available for download, for example READ, NFC TOOLS, and the like. Furthermore, according to an additional embodiment, the communication information stored in the tag 100 is protected, for example by encoding the communication information, against malicious actions, for example attempts to hack the tag 100 and disrupt or steal the communication information. According to yet an additional embodiment, a commercially available general NFC tag may be used as a tag 100 of the accessible signage of the present subject matter. Thus, a customer may load a commercially available tag with communication information relating to the accessible signage according to embodiments of the present subject matter.

Information File

Following communication with the tag 100, a mobile device is prompted to access an information file, configured to provide information relating to a signage to which the tag 100 is attached. Any type of information file known in the art is under the scope of the present subject matter. According to one embodiment, the information file is an audio file providing audible information. According to another embodiment, the information file is a visual information file providing visual information. The visual information may be a stills image, a video clip, a text, and the like. According to yet another embodiment, the information file is a combined audio and visual information file, providing audible and visual information. According to still another embodiment, the information file accessed by the mobile device is a website, for example a Facebook page, a website of an institute, or any other type of website. Furthermore, according to some embodiment, any type of information may be provided by the information file, for example contact details of a personnel, a picture of a personnel, a commercial message, and the like.

According to a further embodiment, the information provided by the information file is related to an outdoor site of interest like identity of for example a bus stop and a mall, a commercial message prompting a user to visit a certain shop, and the like.

According to yet a further embodiment, the information provided by the information file is related to an indoor site of interest like room number, and identity of a department or an employee.

According to still a further embodiment, the information provided by the information file includes directions to locate a site of interest. This embodiment relates to accessible signage located distantly from the site of interest.

An example of a preferred embodiment of the information displayed by the mobile device is a short video, a few seconds long, providing audible and visual information about an identity of a site of interest or directions to locate a site of interest.

According to one embodiment, the visual information file provides written information related to the sign 200 to which the tag 100 is attached, for example a written room number, a name of a department, or instructions to locate a site of interest. According to another embodiment, the written information is displayed with large scripts in order to facilitate reading of the information by people having low vision.

According to a preferred embodiment, in order to increase the availability of the accessible signage worldwide, the written information provided by the information file is available in any language, particularly the main languages, for example English, French, Spanish, German, Russian, Arabic, and Hebrew.

According to another preferred embodiment, in order to maximally provide accessibility to visually impaired people, the combination of background color and script color of the written information provided by the visual information file is with clear contrast and in compliance with color contrasting specifications of accessibility laws and regulations. Examples of a clear combination of background color and script color that is in compliance with color contrasting specifications of accessibility laws and regulations include: yellow background with black script, green background with white script, and blue background with white script. Furthermore, the script size and type of font of the written information provided by the visual information file is in compliance with specifications of accessibility laws and regulations According to another embodiment, the audio file provides audible information related to the signage to which the tag 100 is attached, for example announcing aloud of a room number, a name of a department, or instructions to locate a site of interest. According to a preferred embodiment, the audible information is available in any language, particularly the main languages, as detailed above. According to an additional embodiment, the audial information is also compatible to hearing impaired people, for example by announcing the information twice—once in a regular pace and then in a slower pace, or by any other way known in the art.

Database of Information Files

According to some embodiments, the present subject matter provides a database configured to store information files. The information files in the database are available for being linked to tags 100. A tag 100 is active once it is linked to a corresponding information file. Thus, when a mobile device communicates with a tag 100, the mobile device gets access to an information file that is stored in the database and linked to the tag 100. According to some embodiments, the communication between the mobile device and the database is based on any available wireless communication network, for example the internet.

Figure 5:
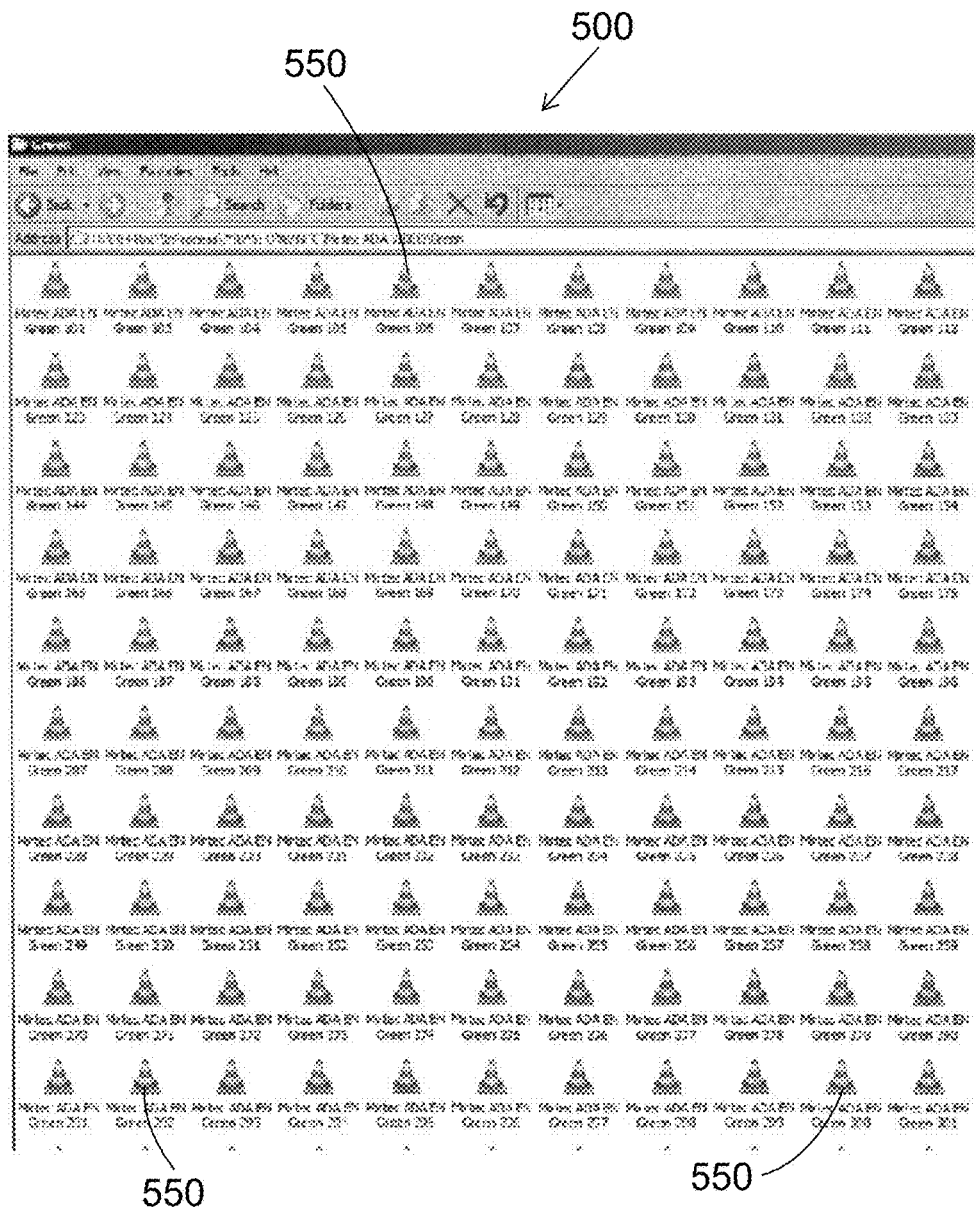
FIG. 5 shows an exemplary computer screen or web page 500 displaying at least one information file icon, to be chosen from by a client.

According to one embodiment, the database includes a selection of various types of information files available for choosing by a client, for example a public institution. FIG. 5 shows an exemplary computer screen or web page 500 displaying at least one information file icon 550, to be chosen from by a client.

According to other embodiments, the present subject matter provides a process for choosing an information file to be linked to a tag from a database of information files. Following is an example of a process for choosing an information file. For purposes of demonstration only, there is described a process for choosing an audio and video information file to be linked with a tag 100 attached to a sign 200 showing a room number, where the file visually displays and vocally announces the room number. The exemplary process of choosing an information file is as follows:

selecting background-script color combination. At this stage a client is prompted to select from a variety of background-script color combinations of the video information, for example selecting from the following combinations: yellow background with black script, green background with white script, blue background with white script, and the like;

selecting a language. At this stage a client to prompted to select from a variety of languages of the audial information, and of the visual information (this does not apply of-course to room numbers, but rather to visual information files present directions to locate a certain site). Examples of languages available for selection include: English, French, Spanish, German, Russian, Arabic, Hebrew, and the like; and specifying a room number. At this stage a client is prompted to select the content of the information that is provided by the information file and displayed by the mobile device. In this example the content is a room number, but any type of content is under the scope of the present subject matter.

Types of Systems

According to some embodiments, various types of systems are available for choosing by a client. According to one embodiment a client may choose a tag 100 linked to a related information file from a variety of tags 100 and related information files available for purchase. According to another embodiment, a client may produce, or order, a customized tag 100 and linked information file according to his needs. This may be done, for example, by purchasing an access to a website dedicated to producing or ordering customized tags 100 and linked information files. These embodiments are suitable to clients purchasing a tag 100 and a linked information file for an existing signage, in order to make the existing signage accessible to visually impaired people. According to yet another embodiment, a client may purchase a sign 200 comprising a tag 100 linked to an information file.

Methods

A method for viewing information, for example information relating to a signage, by a system for operating a visually impaired accessible signage as described herein, is provided, the method comprises bringing a mobile device close to an accessibility tag, and viewing information displayed by the mobile device.

Figure 6A:
FIGS. 6A and 6B show, according to some exemplary embodiments, a mobile device held by a hand of a user, brought close to an accessibility tag, and signage information displayed by the mobile device.
Figure 6B:

FIGS. 6A and 6B show, according to some exemplary embodiments, a mobile device 600 held by a hand 900 of a user, brought close to an accessibility tag 100, and signage information 650 displayed by the mobile device 600. According to one embodiment, the tag 100 is attached to a sign (not shown).

A method for accessing information, for example information relating to a signage, by a system for operating a visually impaired accessible signage as described herein, is provided, the method comprises bringing a mobile device 600 close to an accessibility tag 100, establishing a communication between the accessibility tag 100 and the mobile device 600, accessing an information file linked to the accessibility tag 100 by using the communication information as described herein, and running the information file by the mobile device 600.

The information file is displayed by the mobile device 600 according to the embodiments described herein. For example, the information displayed by the mobile device 600 shown in FIGS. 6A and 6B is a room number, displayed in compliance with color contrasting specifications, and script size and type of font specifications of accessibility laws and regulations. The digits displayed by the mobile devices 600 shown in FIGS. 5A and 5B are large and easily seen by visually impaired persons. Furthermore, in FIG. 6A the background of the visual display is green and the script is white, and in FIG. 6B the background is yellow and the script is black. These examples of color contrasting are both in compliance with color contrasting specifications of accessibility laws and regulations.

According to one embodiment, during the bringing of the mobile device 600 close to the tag 100, the mobile device 600 scans the tag 100. According to another embodiment, the mobile device 600 is brought to a distance in the range of substantially 2-5 cm from the tag 100. According to yet another embodiment, the mobile device 600 is brought to a distance in the range of substantially 2-3 cm from the tag 100. According to still another embodiment, in a case where the tag 100 is an NFC tag, and an NFC sensor is positioned at the back side of a mobile device 600, the mobile device 600 is held with its back facing the tag 100, more particularly with the NFC sensor facing the tag 100, and the screen of the mobile device 600 faces the user, thus enabling the user to watch the information displayed by the mobile device 600, as shown in FIGS. 6A and 6B.

The invention claimed is:

1. A system for operating a visually impaired accessible signage using a mobile device, the system comprising:
    an accessibility tag configured to attach to a signage or to a surface near the signage, store communication information, communicate with the mobile device, prompt visual or audible display of information by the mobile device, wherein the information is gained from an information file, and wherein the accessibility tag can be tactilely recognized by visually impaired people; and
    a database configured to store at least one information file.

2. The system of claim 1, wherein the accessibility tag is configured to communicate with the mobile device by near field communication (NFC).

3. The system of claim 1, wherein the communication information is a uniform resource locator (URL) of a website of the database.

4. The system of claim 1, wherein the communication information is permanently burnt on the accessibility tag.

5. The system of claim 1, wherein the communication information is changeable.

6. The system of claim 1, wherein the information file is configured to provide information relating to the signage to which the accessibility tag is attached.

7. A method for viewing information by a system for operating a visually impaired accessible signage using a mobile device, the system comprising:
    an accessibility tag configured to attach to a signage or to a surface near the signage, store communication information, communicate with the mobile device, prompt visual or audible display of information by the mobile device, wherein the information is gained from an information file, and wherein the accessibility tag can be tactilely recognized by visually impaired people; and
    a database configured to store at least one information file, the method comprising:
    bringing the mobile device close to the accessibility tag; and
    viewing information displayed by the mobile device.

8. The method of claim 7, wherein the accessibility tag is configured to communicate with the mobile device by near field communication (NFC).

9. The method of claim 7, wherein the communication information is a uniform resource locator (URL) of a website of the database.

10. The method of claim 7, wherein the communication information is permanently burnt on the accessibility tag.

11. The method of claim 7, wherein the communication information is changeable.

12. The method of claim 7, wherein the information file is configured to provide information relating to the signage to which the accessibility tag is attached.

13. A method for accessing information by a system for operating a visually impaired accessible signage using a mobile device, wherein the system comprises:
   an accessibility tag configured to attach to a signage or to a surface near the signage, store communication information, communicate with the mobile device, prompt visual or audible display of information by the mobile device, wherein the information is gained from an information file, and wherein the accessibility tag can be tactilely recognized by visually impaired people; and
   a database configured to store at least one information file, the method comprising:
   bringing a mobile device close to an accessibility tag;
   establishing a communication between the accessibility tag and the mobile device;
   accessing an information file linked to the accessibility tag by using the communication information; and
   running the information file by the mobile device.

14. The method of claim 13, wherein the accessibility tag is configured to communicate with the mobile device by near field communication (NFC).

15. The method of claim 13, wherein the communication information is a uniform resource locator (URL) of a website of the database.

16. The method of claim 13, wherein the communication information is permanently burnt on the accessibility tag.

17. The method of claim 13, wherein the communication information is changeable.

18. The method of claim 13, wherein the information file is configured to provide information relating to the signage to which the accessibility tag is attached.

* * * * *